Patented Feb. 10, 1948

2,435,828

UNITED STATES PATENT OFFICE 2,435,828

ALPHA-HYDROXY-ETHER OF FATTY ACID

Herbert H. Guest, West Hartford, Conn., assignor to The J. B. Williams Company, Glastonbury, Conn., a corporation of Connecticut No Drawing. Application September 27, 1944, Serial No. 556,083

14 Claims. (Cl. 260—413)

This invention relates to certain new chemical compounds which may be generically characterized as derivatives of the fatty acids, particularly the higher fatty acids, and to new and improved methods by which they may be prepared. My invention is more especially concerned with new chemical compounds of which the alkanol-ether acids are a type, which new compounds may be regarded as derivatives of α-hydroxy fatty acids. It is also especially concerned with certain new and improved processes by which these new chemical compounds may be readily prepared from α-halogen substituted saturated higher fatty acids, and their esters and salts.

The α-hydroxy fatty acids, particularly the α-hydroxy-substituted higher fatty acids, such as those of the $C_{12}$ to $C_{18}$ saturated fatty acids, are known chemical compounds. Among methods utilized in their preparation is one wherein an α-halogen-substituted fatty acid, such as α-bromostearic acid, is reacted with an aqueous or alcoholic solution of an alkali such as caustic soda.

The new chemical compounds with which this application is concerned may be prepared by reacting a derivative of a fatty acid, more particularly a saturated, higher fatty acid of the $C_{12}$ to $C_{18}$ group, i. e., the group extending between and including both lauric acid and stearic acid, with an alkali metal derivative of a compound containing more than one hydroxyl group. While I am more particularly concerned with the new chemical compounds prepared from the naturally occurring higher fatty acids containing an even number of carbon atoms, and their derivatives, I may also prepare new chemical compounds from derivatives of higher saturated fatty acids having an odd number of carbon atoms, to the extent that suitable starting materials are available.

Thus, I may react an α-halo derivative of a saturated higher fatty acid of the $C_{12}$ to $C_{18}$ group, or a salt or ester of the α-halo acid, with an alkali metal derivative of a polyhydric alcohol. Among suitable polyhydric alcohols may be mentioned the glycols and glycerol, as well as polyhydric alcohols having two or more hydroxyl groups attached to carbon atoms which are not at the ends of the carbon chain, or which hydroxyls are not located on adjacent carbon atoms. I may also utilize, of course, the polyhydric alcohols wherein one or more of the hydroxyls is attached to an intermediate carbon atom of the chain, while one or more are attached to carbon atoms at the ends of the chain.

The new chemical compounds resulting are characterized by having the polyhydric alcohol residue attached through the oxygen atom of one hydroxyl group to that carbon atom of the saturated higher fatty acid which is in the alpha position to the carboxyl of the acid. This ether linkage to the carbon atom of the saturated fatty acid is thus made through the oxygen atom of a reactive hydroxyl group of the polyhydric alcohol. In the case of polyhydric alcohols having both primary and secondary hydroxyl groups, the attachment of the polyhydric alcohol residue through the oxygen atom of one of its hydroxyls is made through the oxygen atom of its primary hydroxyl group. Similarly, with polyhydric alcohols having both secondary and tertiary hydroxyl groups, the attachment is through the secondary or more reactive hydroxyl, rather than through the oxygen atom of the tertiary hydroxyl.

When an alkali metal derivative of a polyhydric alcohol such as a glycol or glycerol, or other diol or polyol, is reacted with the derivative of the higher fatty acid in accordance with my invention, the resulting new chemical compounds may be characterized generally by the typical formula:

where Y is the polyhydric alcohol residue, and R is an alkyl radical, more particularly an alkyl radical selected from the group extending between and including decyl and hexadecyl.

Where new chemical compounds are prepared in accordance with my invention by reacting an alkali metal derivative of a glycol or glycerol with a derivative of the higher fatty acid, the resulting new compound in this special and preferred case may be characterized generically by the type formula:

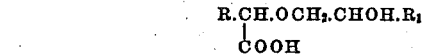

where R is an alkyl radical, more particularly an alkyl radical selected from the group extending between and including decyl and hexadecyl, and $R_1$ represents a radical selected from the group which consists of hydrogen, alkyl radicals, and methylol ($CH_2OH$).

As a typical example of the products resulting when an alkali metal derivative of a polyhydric alcohol other than glycerol or one of the glycols having hydroxyl groups on adjacent carbon atoms is reacted, I may refer as an illustration to the product produced by reacting an alkali metal derivative of a dihydric alcohol, such as 2-methyl-2, 4-pentane-diol, with an alpha-halo substituted higher fatty acid or its salts or esters. There are thus produced new chemical compounds having the following type formula:

$$R.CH-OCH_2.CH_2.C(OH).(CH_3)_2$$
$$|$$
$$COOH$$
$$|$$
$$CH_3$$

where R is an alkyl radical, more particularly an alkyl radical selected from the group extending between and including decyl and hexadecyl.

The new chemical compounds which I have prepared by reacting alkali metal derivatives of the polyhydric alcohols with alpha-halo substituted higher fatty acids or their salts or esters may thus be generically characterized by the following type formula:

$$R.CH-OCH.Q$$
$$|\quad\quad|$$
$$COOH\ S$$

where R is an alkyl radical, more particularly an alkyl radical of the group extending between and including decyl and hexadecyl; S represents hydrogen or an alkyl group; and Q represents a substituted aliphatic group containing at least one hydroxyl substituent.

The new chemical compounds resulting are especially valuable in the manufacture of soaps, and as ingredients in cosmetic preparations, of which they enhance the water-retaining properties. They are also useful in the preparation of brushless shaving creams and cosmetic lotions. They combine, in many ways, the advantages of the partial esters, such as glycerol monostearate, and those of the soaps prepared industrially from coconut oil. However, they possess certain definite advantages over the lower molecular weight fatty acid soaps as commercially produced from coconut oil. Being derived from acids which occur as glycerides in animal and vegetable fats of fairly wide distribution, they are capable of being prepared from commercially available raw materials, as contrasted with coconut oil which must be imported.

Among illustrative new chemical compounds which may be produced in accordance with my process I may mention, as representative, the α-ethylene glycol derivatives of the $C_{12}$ to $C_{18}$ saturated higher fatty acids, as, for example, the α-ethylene glycol derivatives of lauric acid, myristic acid, palmitic acid, and stearic acid. These compounds, in which the ethylene glycol residue is attached in the alpha position to the acid carboxyl group, may be otherwise named, α-ethylene glycol stearic acid being termed, for example, α-(2 ethanol-1-ether) octadecanoic acid:

$$C_{16}H_{33}.CH\ OCH_2.CH_2OH$$
$$|$$
$$COOH$$

Similarly, α-ethylene glycol lauric acid may be named: α-(2 ethanol-1-ether) dodecanoic acid. α-ethylene glycol myristic acid may be termed: α-(2 ethanol-1-ether) tetradecanoic acid, while α-ethylene glycol palmitic acid is also called: α-(2 ethanol-1-ether) hexadecanoic acid.

New chemical compounds which may be formed by reaction between the α-halo saturated higher fatty acid, or its salts or esters, and the alkali metal derivatives of other glycols, such as propylene glycol, also come within the scope of my invention. Among representative compounds may be mentioned α-propylene glycol stearic acid, also termed α-(propane-2-ol-1-ether) octadecanoic acid, having the formula:

$$C_{16}H_{33}.CH\cdot OCH_2.CHOH.CH_3$$
$$|$$
$$COOH$$

Other representative compounds include α-propylene glycol lauric acid, also termed α-(propane-2-ol-1-ether) dodecanoic acid; α-propylene glycol myristic acid, also termed α-(propane-2-ol-1-ether) tetradecanoic acid; and α-propylene glycol palmitic acid, also termed α-(propane-2-ol-1-ether) hexadecanoic acid.

New chemical compounds which may be produced by reacting an α-halo higher fatty acid, or salt or ester thereof, with an alkali metal derivative of glycerol are also within the scope of my invention. These include, as representative compounds, α-glyceryl lauric acid, also termed α-(2,3 propanediol-1-ether) dodecanoic acid having the formula:

$$C_{10}H_{21}.CH.OCH_2.CHOH.CH_2OH$$
$$|$$
$$COOH$$

Other illustrative compounds of this type include α-glyceryl myristic acid, also termed α-(2,3 propanediol-1-ether) tetradecanoic acid; α-glyceryl palmitic acid; also termed α-(2,3 propanediol-1-ether) hexadecanoic acid; and α-glyceryl stearic acid, also termed α-(2,3 propanediol-1-ether) octadecanoic acid, having the formula:

$$C_{16}H_{33}.CH.OCH_2.CHOH.CH_2OH$$
$$|$$
$$COOH$$

Other new fatty acid derivatives coming within the scope of my invention include those compounds which may be prepared by reaction with alkali metal derivatives of other polyhydric alcohols as, for example, 2-methyl-2,4 pentanediol, $CH_3.CHOH.CH_2.C(OH)(CH_3)_2$. Taking stearic acid as an example of the $C_{12}$ to $C_{18}$ acids, there is produced in this way α-(butane-1,3 dimethyl-3-ol-1-ether) octadecanoic acid, having the formula:

$$C_{16}H_{33}.CH\ .\ OCH.CH_2.C(OH)(CH_3)_2$$
$$|\quad\quad\quad\quad|$$
$$COOH\quad\ CH_3$$

The general reaction by which my new compounds are prepared involves reacting an alkali metal derivative, preferably a sodium or potassium derivative, of the polyhydric alcohol with the α-halo higher fatty acid, or with an ester or salt of the α-halo higher fatty acid. The alkali metal derivative has the alkali metal substituted in place of hydrogen in a reactive hydroxyl group of the polyhydric alcohol, for example in a primary hydroxyl, if there is one, or in a secondary hydroxyl group.

Taking as representative the reaction between an alkali metal derivative of a glycol or glycerol and the higher fatty acid itself, the reaction may be represented as follows:

$$R.CHX.COOH + 2R_1CHOH.CH_2OM \longrightarrow$$

$$R.CH.OCH_2CHOH.R_1 + MX + R_1CHOH.CH_2OH$$
$$|$$
$$COOM$$

wherein R is a higher alkyl radical, more especially an alkyl radical selected from the group extending from decyl to hexadecyl and including, as specific examples, decyl, dodecyl, tetradecyl, and hexadecyl; $R_1$ represents hydrogen, an alkyl radical or methylol; X represents a halogen; and M represents an alkali metal.

When an ester or salt of the α-halo higher fatty acid is used in place of the α-halo higher fatty acid itself the reaction is the same, the ester being first converted by hydrolysis into a salt of the α-halo higher fatty acid, which then reacts with the alkali metal derivative of the polyhydric alcohol in the manner indicated in the above equation. Obviously any ester may be utilized, since the ester breaks up during the process. For convenience I prefer, in many cases, to utilize a lower alkyl ester of the α-halogen substituted higher fatty acid. Any salt can of course also be utilized, as the product is converted to the desired α-substituted acid during the subsequent acidification. For convenience, however, I may use alkali metal salts such as the sodium and potassium salts.

The resulting alkali metal salt of the desired α-substituted higher fatty acid, formed as indicated above, is converted to the new chemical compounds, the α-substituted fatty acids, by acidification, in accordance with a reaction represented, in that case where a polyhydric alcohol such as a glycol or glycerol has been reacted, by the following equation:

R, R₁ and M have the significance indicated above, and Ac represents the acyl radical of the particular acid used in the acidification step. This acid may conveniently be hydrochloric acid, sulfuric acid, or any other inexpensive acid, generally available in commercial quantities.

Similarly, the sodium or other alkali metal derivatives of the alpha-substituted acids resulting when alkali metal derivatives of other polyhydroxy compounds are reacted is converted to the corresponding substituted acid by acidification.

Reaction between the sodium, potassium, or other alkali metal derivative of the glycol, glycerol, or other polyhydric alcohol utilized, and the alpha-halo fatty acid, or its esters or salts, may be readily carried out in the presence of an inert solvent such as xylene. It may be facilitated by mechanical stirring and by the use of a moderate degree of heat, as by refluxing the reactants together. The pasty reaction mixture resulting may be readily acidified with any dilute acid as, for example, with hydrochloric acid, sulfuric acid, phosphoric acid, etc., in order to convert the alkali metal salt of the substituted higher fatty acid into the desired substituted fatty acid itself, wherein the polyhydric alcohol residue is attached by the oxygen atom of a reactive hydroxyl group to that carbon atom of the higher fatty acid which is in the alpha position to the carboxyl group. The fatty acid derivative desired will then usually separate from the aqueous reaction mixture, and may be secured in the pure state by removing residual solvent by distillation or other procedure.

The alkali metal derivative of the polyhydric alcohol, such as the sodium derivatives of ethylene glycol, propylene glycol, glycerol, 2-methyl-2,4-pentanediol, or other polyhydric alcohol utilized in the reaction, may be readily prepared by known procedures. Thus it is possible to react the free alkali metal with a polyhydric alcohol such as a glycol, thereby producing a solution of the alkali metal derivative of the glycol, which may be used as such in the reaction with the α-halogen-substituted acid or its salts or esters.

In preparing alkali metal derivatives of glycerol and other viscous hydroxy compounds, I may utilize a new and improved procedure, as the presently available methods are not entirely satisfactory for preparing alkali metal derivatives of glycerol. In accordance with this procedure the glycerol is first dehydrated, which may be readily accomplished by any of various methods known to the art, such as by distilling the glycerol with an inert solvent such as xylene, first at ordinary or atmospheric pressure, and then under reduced pressure, until substantially all the water and inert hydrocarbon diluent are removed.

The dehydrated glycerol may then be reacted with an alkali metal alcoholate such as sodium ethylate. Upon removal of the alcohol corresponding to the alcoholate formed as one of the products of the reaction, either by distillation or otherwise, there results a solution of the alkali metal glycerinate in glycerol, which solution may be utilized in my process for preparing the higher fatty acid derivatives.

As examples of my new α-substituted saturated higher fatty acids containing the polyhydric alcohol residue attached through the oxygen atom of a reactive hydroxyl group in the alpha position, and the methods by which they may be produced, the following may be taken as illustrative.

EXAMPLE 1

PREPARATION OF α-GLYCERYL STEARIC ACID

A. Preparation of alkali metal glycerinate

Glycerol in the amount of 200 grams was dehydrated by distilling it with 100 grams of xylene, first at atmospheric pressure, and then under reduced pressure, until all the water and hydrocarbon were removed, including a small amount of glycerol. At the same time sodium ethylate was prepared by dissolving 5 grams of sodium in 100 grams of absolute ethanol. This solution was added to the anhydrous glycerol, and ethanol distilled off. There was thus obtained a solution of sodium glycerinate in glycerol.

B. Preparation of α-glyceryl stearic acid

The methyl ester of alpha-bromostearic acid in the amount of 45 grams was dissolved in 50 grams of xylene and the resulting solution added to the solution of sodium glycerinate in glycerol. The mixture was subjected to mechanical stirring, and heated to the reflux temperature in a reflux column for one-half hour. At the end of this time the ester had reacted with the alkali metal glycerinate to form sodium α-glyceryl stearate, methanol, and sodium bromide.

The resulting paste was dissolved in water and acidified with 10% sulfuric acid. This resulted in the conversion of the sodium salt to the substituted fatty acid, which separated from the lower aqueous layer. Separation of the acid could be facilitated by the addition of further amounts of xylene or other solvent, if necessary.

The pure acid was obtained when the solvent was removed by distillation. It was identified as α-glyceryl stearic acid having structural formula:

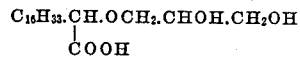

The compound may also be named α-(2,3 propanediol-1-ether) octadecanoic acid. Its saponification number was 150 and its acetyl number 245, agreeing exactly with the calculated values for this acid.

EXAMPLE 2

PREPARATION OF α-ETHYLENE GLYCOL STEARIC ACID

A sodium derivative of glycol was prepared by adding 4.7 grams of metallic sodium to 280 grams of substantially anhydrous ethylene glycol. To this solution there was then added 25 grams of the methyl ester of α-chlorostearic acid. The mixture was heated to the reflux temperature and refluxed for approximately one hour.

The resulting reaction mixture was filtered to separate the precipitated sodium chloride, and then distilled under a reduced pressure less than atmospheric to remove excess glycol. The still residue was then dissolved in water and, upon acidification with 10% sulfuric acid solution, an oil rose to the surface of the aqueous reaction mixture and could be separated mechanically. This oil contained some alpha-beta unsaturated acid ($\Delta^2$ octadecanoic acid), but was principally the desired ethylene glycol derivative of stearic acid, $\alpha$-(2-ethanol-1-ether) octadecanoic acid. The acid could be used for soap-making or other purposes without removing the small amount of unsaturated octadecanoic acid present therein.

EXAMPLE 3

PREPARATION OF $\alpha$-PROPYLENE GLYCOL STEARIC ACID

The sodium derivative of propylene glycol was prepared by adding 6.5 grams of metallic sodium in small amounts to 210 grams of propylene glycol. The solution was then added to 50 grams of $\alpha$-bromostearic acid dissolved in 50 grams of benzene. The reactants were stirred and the reaction was complete in one-half hour, the temperature not exceeding 100° C. Excess glycol was then removed by distillation of the reaction mixture under a pressure less than atmospheric.

The residual pasty material was dissolved in water and acidified with dilute hydrochloric acid. A water-insoluble acid, the $\alpha$-propylene glycol derivative of stearic acid, separated from the reaction mixture and was removed by mechanical means. This acid may also be named $\alpha$-(propane-2-ol-ether) octadecanoic acid.

EXAMPLE 4

PREPARATION OF $\alpha$-GLYCERYL PALMITIC ACID

The sodium derivative of glycerol was first prepared. 380 grams of glycerol was dehydrated by distilling it with 100 grams of xylene, first at atmospheric pressure, and then at reduced pressure less than atmospheric. A solution of sodium ethylate was prepared from 10 grams of sodium and 200 grams of ethanol. This was added to the dehydrated glycerol and excess ethanol distilled off, thereby resulting in a solution of sodium glycerinate in glycerol.

Fifty grams of $\alpha$-bromopalmitic acid were added to the sodium glycerinate, and the mixture heated to 100° C. for one-half hour, at the end of which time the reaction was complete. Upon acidification with a dilute acid there was obtained a wax-like low-melting solid which was readily soluble in ethanol and emulsifiable with water. It was $\alpha$-glyceryl palmitic acid or $\alpha$-(2,3-propanediol-1-ether) hexadecanoic acid. Its neutralization value was 166, which agreed with the neutralization value as calculated for this acid.

EXAMPLE 5

PREPARATION OF $\alpha$-PROPYLENE GLYCOL MYRISTIC ACID

First procedure

Seven grams of metallic sodium were dissolved in a mixture of 100 grams of absolute ethanol and 100 grams of propylene glycol. Excess alcohol was distilled off and distillation continued until a small amount (10 grams) of the glycol had also been distilled over. The distillation was first carried out at atmospheric pressure, and then under reduced pressure in a partial vacuum.

After the solution of the sodium derivative of propylene glycol thus produced had cooled, it was added to a flask containing 40 grams of methyl $\alpha$-bromomyristate. The resulting reaction mixture was heated for half an hour at 100° C. until the reaction was complete.

Upon acidification there was secured an oil which rose to the surface of the reaction mixture. This was the desired acid, $\alpha$-propylene glycol myristic acid, also termed $\alpha$-(propane-2-ol-1-ether) tetradecanoic acid. Its saponification number, 186, agreed almost exactly with the calculated value.

Second procedure

The same acid was also prepared by dissolving 15 grams of solid potassium hydrate (KOH) in 100 grams of absolute ethanol. Propylene glycol in the amount of 100 grams was then added, and the mixture distilled, first at atmospheric pressure, and then under reduced pressure less than atmospheric, until 110 grams of the mixed alcohol and glycol had been distilled off from the mixture.

The resulting potassium derivative of propylene glycol was mixed with 30 grams of methyl $\alpha$-bromomyristate and the mixture heated at 100° C. for one-half hour. Upon acidification the identical $\alpha$-(propane-2-ol-1-ether)-tetradecanoic acid was obtained.

EXAMPLE 6

PREPARATION OF $\alpha$-GLYCERYL STEARIC ACID

Solid potassium hydroxide pellets in the amount of 15 grams were dissolved in 100 grams of absolute ethanol by heating under a reflux condenser. Glycerol in the amount of 150 grams, which had previously been heated to 210° C. for a short time in order to render it substantially anhydrous, was then added to the alcohol solution. The resulting mixture was then distilled, first at atmospheric pressure and then under partial vacuum until glycerol began to appear in the distillate.

The resulting potassium glycerinate solution was then cooled and mixed, with mechanical stirring, with 30 grams of methyl $\alpha$-bromostearate. The resulting mixture was heated to 130° C. for one-half hour. When the reaction mixture was poured into water and acidified, an emulsion formed. The desired acid was then recovered by extraction with benzene. When the solvent was removed by distillation, $\alpha$-glyceryl stearic acid, also called $\alpha$-(2,3,propanediol-1-ether) octadecanoic acid was recovered. It had a saponification number of 156, and a hydroxyl value of 221, agreeing very closely with the calculated values for this compound.

EXAMPLE 7

PREPARATION OF $\alpha$-PROPYLENE GLYCOL LAURIC ACID

Fifteen grams of solid potassium hydroxide were dissolved in 50 grams of absolute ethanol by heating. To the resulting solution 100 grams of propylene glycol were added, and the mixture distilled, first at atmospheric pressure, and then at a pressure less than atmospheric. Distillation was continued until 70 grams of unreacted ethanol and glycol were distilled over.

The resulting solution of the potassium derivative of propylene glycol was cooled and then added to 25 grams of methyl $\alpha$-chlorolaurate with mechanical stirring. The resulting reaction mixture was heated to 150° C. for 25 minutes until reaction was complete.

Upon acidification, removal of the separated oil, and washing, there was obtained an oil which consisted of a mixture of acids. About 50% was unsaturated, and the other 50%, which could be separately recovered, consisted of α-propylene glycol lauric acid, also called α-(propane-2-ol-1-ether) dodecanoic acid.

EXAMPLE 8

PREPARATION OF α - (1,3,DIMETHYL-3-HYDROXY-1-ETHER BUTANE) OCTADECANOIC ACID

Anhydrous ethanol in the amount of 100 grams was reacted with five grams of metallic sodium. After all the sodium had dissolved, 110 grams of 2-methyl-2,4-pentanediol were added, and the mixture subjected to distillation, first at atmospheric pressure, and then under reduced pressure less than atmospheric. The distillation was continued until approximately 103 grams of unreacted ethanol and alcohol were distilled over. This resulted in a solution of the sodium derivative of 2-methyl-2,4-pentanediol.

This solution was then added to 30 grams of α-bromostearic acid and the reaction mixture heated for one hour at 100° C. Upon acidification with dilute sulfuric acid, an oil rose to the surface and was separated. It was washed several times with hot water and then dried on a steam bath. The resulting product was an oily semi-solid, and had a neutralization value of 140. The product was α-(1,3,dimethyl-3-hydroxy-1-ether butane)-octadecanoic acid.

The ether groups of polyhydric alcohol residues on my new fatty acid derivatives are firmly attached to the acyl group and cannot be removed during the saponification process. The new compounds are, in general, oily or wax-like products which readily form soaps with the alkali and alkaline earth metals, and with amines or alkanol amines, such as triethanolamine.

The compound α-glyceryl stearic acid, or α-(2,3 propanediol-1-ether) octadecanoic acid, may be regarded as typical of the new chemical compounds. It is a wax-like solid, melting without definite melting point at about 40 to 50° C. It is insoluble in water but forms a stable emulsion therewith, foaming readily on agitation. It is soluble in ethanol at room temperature. It forms soap-like sodium, potassium, and amine salts. These salts foam freely, even in salt water. Its sodium soap is readily soluble in water, as contrasted with sodium stearate which is almost insoluble in cold water. The sodium soap can be salted out of solution with sodium hydroxide or sodium chloride.

A barium soap readily forms upon the addition of barium chloride solution to a solution of the potassium or sodium soap. The barium soap precipitates out as an insoluble white solid. The armine soaps form clear jellies at room temperature, and are soluble in hard water and sea water, as well as in various organic liquids, including oil and benzene.

My invention is particularly applicable to preparing a mixture of the alpha-substituted palmitic and stearic acids with the polyhydric alcohol residue attached in the alpha position to the carboxyl group, such as result when derivatives of the stearic acid of commerce, which is a mixture of palmitic and stearic acids, are utilized in the process.

The foregoing description and examples are intended to be illustrative only. Modifications thereof which conform to the spirit of the invention, or variations therefrom, as they may be within the scope of the appended claims, are to be considered part of my invention.

I claim:

1. An alpha-substituted fatty acid having the formula:

where R is an alkyl radical containing at least ten carbon atoms and Y is a monovalent, simple functional, saturated, aliphatic, polyhydric alcohol residue, said residue containing less than three hydroxyl groups.

2. An alpha-substituted fatty acid having the formula:

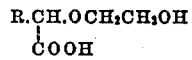

where R is an alkyl radical having an even number, from ten to sixteen inclusive, of carbon atoms.

3. An alpha-substituted fatty acid having the formula:

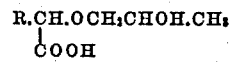

where R is an alkyl radical having an even number, from ten to sixteen inclusive, of carbon atoms.

4. An alpha-substituted fatty acid having the formula:

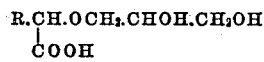

where R is an alkyl radical having an even number from ten to sixteen inclusive, of carbon atoms.

5. α-(2,3 propanediol-1-ether) octadecanoic acid.

6. α-(2-ethanol-1-ether) octadecanoic acid.

7. α-(propane-2-ol-1-ether) octadecanoic acid.

8. The method of producing an alpha-substituted fatty acid which comprises reacting an alkali metal derivative of a simple functional, saturated, aliphatic, polyhydric alcohol having less than four hydroxyl groups with a compound selected from the group which consists of the higher saturated α-halogen substituted fatty acids having twelve to eighteen carbon atoms and their salts and esters, and acidifying the reaction mixture.

9. The method of producing an alpha-substituted fatty acid which comprises reacting an alkali metal derivative of glycerol with a higher α-halogen substituted fatty acid having from twelve to eighteen carbon atoms and acidifying the reaction mixture.

10. An α-substitute fatty acid having the formula

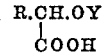

in which R is an alkyl radical containing at least ten carbon atoms and Y is a monovalent, simple functional, saturated, aliphatic, polyhydric alcohol residue, said residue containing less than seven carbon atoms and less than three hydroxyl groups.

11. An α-substitute fatty acid having the formula

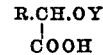

in which R is an alkyl radical containing at least ten carbon atoms and Y is a monovalent, simple functional, saturated, aliphatic, polyhydric alcohol residue, said residue containing less than four carbon atoms and less than three hydroxyl groups.

12. The method of producing an alpha substituted fatty acid which comprises reacting an alkali metal derivative of a simple functional, saturated, aliphatic polyhydric alcohol having less than seven carbon atoms and less than four hydroxyl groups with a saturated higher α-halogen substituted fatty acid having twelve to eighteen carbon atoms, and acidifying the reaction mixture.

13. The method of producing an alpha substituted fatty acid which comprises reacting an alkali metal derivative of a simple functional, saturated, aliphatic polyhydric alcohol having less than seven carbon atoms and less than four hydroxyl groups with a salt of a saturated higher α-halogen substituted fatty acid having twelve to eighteen carbon atoms, and acidifying the reaction mixture.

14. The method of producing an alpha substituted fatty acid which comprises reacting an alkali metal derivative of a simple functional, saturated, aliphatic polyhydric alcohol having less than seven carbon atoms and less than four hydroxyl groups with an ester of a saturated higher α-halogen substituted fatty acid having twelve to eighteen carbon atoms, and acidifying the reaction mixture.

HERBERT H. GUEST.

REFERENCES CITED

The following references are of record in the file of this patent:

UNITED STATES PATENTS

| Number | Name | Date |
| --- | --- | --- |
| 2,109,929 | Rigby | Mar. 1, 1938 |
| 2,277,015 | Guest | Mar. 17, 1942 |
| 2,277,016 | Guest | Mar. 17, 1942 |

OTHER REFERENCES

Lowy and Harrow, "An Introduction to Organic Chemistry," ed. 5, 1940, page 70, John Wiley & Sons, N. Y. (Copy (140) in Div. 43.)

Karrer, "Organic Chemistry," N. Y. 1938, page 228.